US012412525B2

(12) United States Patent
Hsiao

(10) Patent No.: US 12,412,525 B2
(45) Date of Patent: Sep. 9, 2025

(54) PIXEL CIRCUIT OF DISPLAY PANEL

(71) Applicant: NOVATEK Microelectronics Corp., Hsin-Chu (TW)

(72) Inventor: Sheng-Wen Hsiao, Changhua County (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 18/244,313

(22) Filed: Sep. 11, 2023

(65) Prior Publication Data

US 2024/0161694 A1 May 16, 2024

Related U.S. Application Data

(60) Provisional application No. 63/424,140, filed on Nov. 10, 2022.

(51) Int. Cl.
*G09G 3/3233* (2016.01)
*G09G 3/3266* (2016.01)
*G09G 3/3291* (2016.01)

(52) U.S. Cl.
CPC ......... *G09G 3/3233* (2013.01); *G09G 3/3266* (2013.01); *G09G 3/3291* (2013.01); *G09G 2310/08* (2013.01)

(58) Field of Classification Search
CPC .. G09G 3/3233; G09G 3/3266; G09G 3/3291; G09G 2310/08; G09G 2300/0819; G09G 2300/0861; G09G 2300/0842; G09G 2300/0426; G09G 2320/045; G09G 2310/0251; G09G 2310/0262; G09G 2300/0852; G09G 2320/0233; G09G 3/3258; G09G 3/32; G09G 2320/043; G09G 3/3225; G09G 2320/0238; G09G 2310/061
See application file for complete search history.

(56) References Cited

U.S. PATENT DOCUMENTS

2019/0019455 A1* 1/2019 Chen .................... G09G 3/3258
2020/0135091 A1* 4/2020 Kim ..................... G09G 3/3233
2021/0158755 A1* 5/2021 Li ........................ G09G 3/3266
2021/0280132 A1* 9/2021 Gao ..................... G09G 3/3233
(Continued)

FOREIGN PATENT DOCUMENTS

TW 202226199 A 7/2022
TW 202303563 A 1/2023

*Primary Examiner* — Sujit Shah
(74) *Attorney, Agent, or Firm* — Winston Hsu

(57) ABSTRACT

A pixel circuit of a display panel includes a driving transistor, a first capacitor, a second capacitor, a first transistor, a second transistor, a third transistor, a fourth transistor, a fifth transistor and a light emitting device. The driving transistor includes a first terminal, a second terminal and a gate terminal. The first capacitor is coupled to the gate terminal of the driving transistor. The second capacitor is connected to the first terminal of the driving transistor. The first transistor is coupled to the second terminal of the driving transistor. The second transistor is coupled to the second capacitor. The third transistor is coupled between the first terminal and the gate terminal of the driving transistor. The fourth transistor is coupled to the first terminal of the driving transistor. The fifth transistor is coupled to the driving transistor. The light emitting device is coupled to the fourth transistor.

15 Claims, 12 Drawing Sheets

(56) References Cited

U.S. PATENT DOCUMENTS

| | | | | |
|---|---|---|---|---|
| 2022/0059032 | A1 | 2/2022 | Kang | |
| 2022/0148502 | A1* | 5/2022 | Kim | G09G 3/3266 |
| 2022/0301507 | A1 | 9/2022 | Kuang | |
| 2022/0310016 | A1* | 9/2022 | Yang | G09G 3/3266 |

* cited by examiner

PIXEL CIRCUIT OF DISPLAY PANEL

CROSS REFERENCE TO RELATED APPLICATIONS

This application claims the benefit of U.S. Provisional Application No. 63/424,140, filed on Nov. 10, 2022. The content of the application is incorporated herein by reference.

BACKGROUND OF THE INVENTION

1. Field of the Invention

The present invention relates to a pixel circuit of a display panel, and more particularly, to the structure of a pixel circuit of a display panel capable of canceling the offset of threshold voltages.

2. Description of the Prior Art

Among those next-generation display technologies, the micro organic light emitting diode (micro-OLED) panel has become important in recent years. Unlike conventional LED or OLED panels with their screens being built on a glass substrate, the screen of a micro-OLED panel is directly mounted to a silicon wafer. The silicon-based implementation could achieve a wide variety of benefits such as small size, light weight, low power consumption, high luminous efficiency, high contrast and high pixel density. With the above advantages, the micro-OLED panel is particularly suitable for augmented reality (AR) and virtual reality (VR) applications.

However, in the silicon-based implementation, the data voltages for controlling the driving transistors in the pixels fall within an operational range about 200 mV-300 mV, which is far smaller than the operational range of the data voltages in the thin-film transistor (TFT)-based implementation under the same pixel structure. This is because the device mobility of the transistors in the silicon-based implementation is higher, which means that the voltage swing range required for generating the same driving current becomes smaller. The smaller voltage swing range requires a much finer resolution to achieve the same grayscale and gamma level, which is accompanied by higher design difficulty and more circuit costs. For example, in an application with 256 grayscales, one step voltage may be about 1 mV for each gray level if the operational voltage range is between 200 mV and 300 mV, which easily generates an error on the data voltage due to non-ideal grayscale-to-voltage mapping. Thus, there is a need for improvement over the prior art.

SUMMARY OF THE INVENTION

It is therefore an objective of the present invention to provide a novel pixel circuit for an organic light emitting diode (OLED) panel, especially a micro-OLED panel, so as to solve the abovementioned problems.

An embodiment of the present invention discloses a pixel circuit of a display panel, which comprises a driving transistor, a first capacitor, a second capacitor, a first transistor, a second transistor, a third transistor, a fourth transistor, a fifth transistor and a light emitting device. The driving transistor comprises a first terminal, a second terminal and a gate terminal. The first capacitor is coupled to the gate terminal of the driving transistor. The second capacitor is connected to the first terminal of the driving transistor. The first transistor is coupled to the second terminal of the driving transistor. The second transistor is coupled to the second capacitor. The third transistor is coupled between the first terminal of the driving transistor and the gate terminal of the driving transistor. The fourth transistor is coupled to the first terminal of the driving transistor. The fifth transistor is coupled to the driving transistor. The light emitting device is coupled to the fourth transistor.

Another embodiment of the present invention discloses a pixel circuit of a display panel, which comprises a driving transistor, a first capacitor, a second capacitor, a first transistor, a second transistor, a third transistor, a fourth transistor, a fifth transistor and a light emitting device. The driving transistor comprises a first terminal, a second terminal and a gate terminal. The first capacitor is coupled to the gate terminal of the driving transistor. The second capacitor is connected to the first terminal of the driving transistor. The first transistor is coupled to the first terminal of the driving transistor. The second transistor is coupled to the second capacitor. The third transistor is coupled between the first terminal of the driving transistor and the gate terminal of the driving transistor. The fourth transistor is coupled to the second terminal of the driving transistor. The fifth transistor is coupled to the first capacitor and the fourth transistor. The light emitting device is coupled to the fourth transistor.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
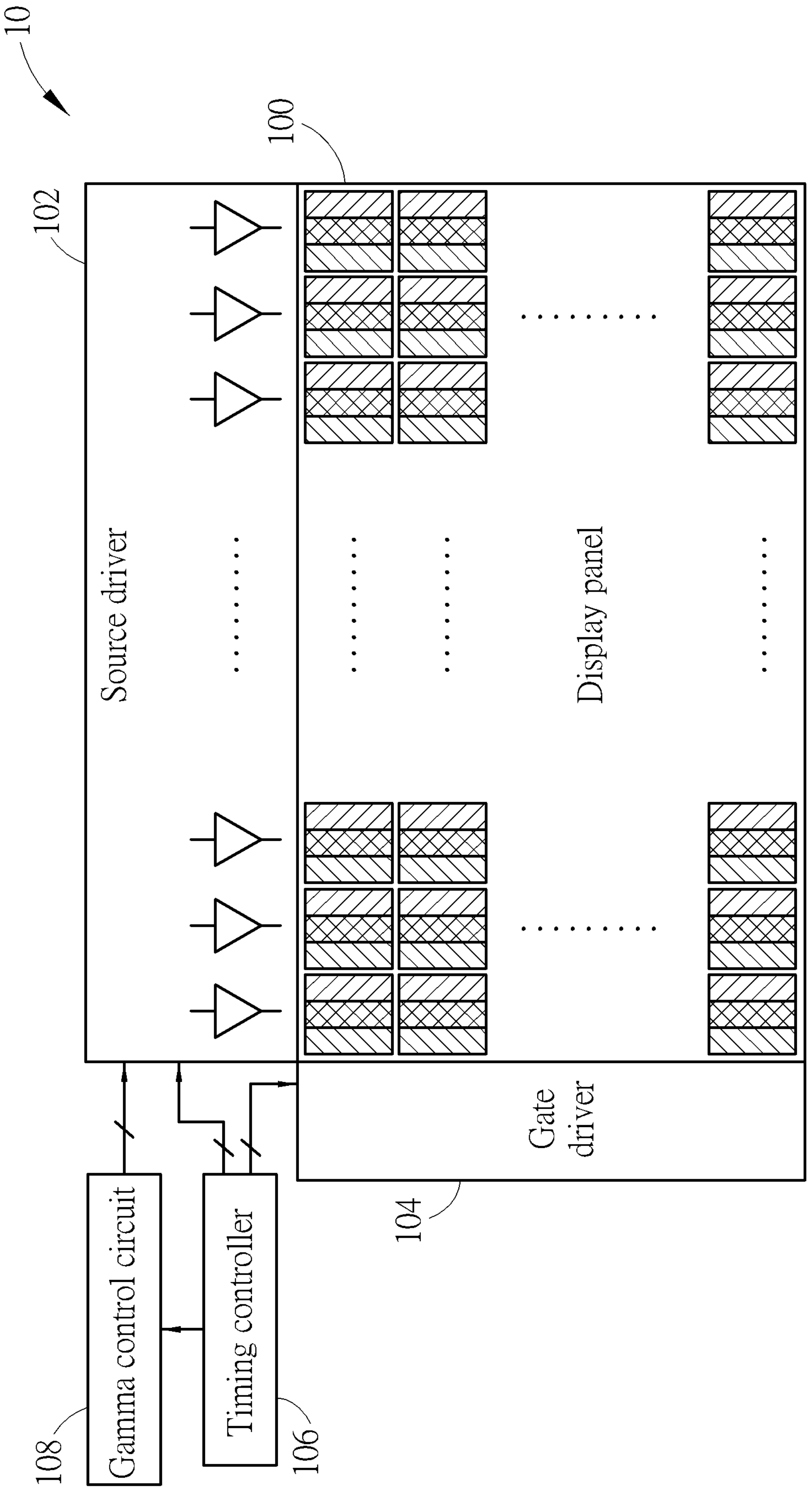
FIG. 1 is a schematic diagram of a display system according to an embodiment of the present invention.

FIG. 1 is a schematic diagram of a display system 10 according to an embodiment of the present invention. The display system 10 includes a display panel 100, a source driver 102, a gate driver 104, a timing controller 106 and a gamma control circuit 108. The display system 10 may be implemented in any electronic device having display functions, such as a laptop, mobile phone, or wearable electronic device.

The display panel 100 may perform display operations by receiving control signals from the gate driver 104 and receiving display data voltages from the source driver 102 based on a control timing determined by the timing controller 106. As shown in FIG. 1, each pixel of the display panel 100 may include three subpixels, but one of ordinary skill in the art should know that there may be any number of subpixels contained in a pixel. The display panel 100 may be, but not limited to, a light emitting diode (LED) panel, mini-LED panel, micro-LED panel, ultra-LED panel, organic LED (OLED) panel, mini-OLED panel or micro-OLED panel. In an embodiment, the display panel 100 may be a micro-OLED panel in which the pixel circuits are implemented with the complementary metal-oxide semiconductor (CMOS) process, as the silicon-based implementation.

The source driver 102 (or called data driver) is configured to output data voltages to the target pixels on the display panel 100 through the data lines. The source driver 102 may receive grayscale data from the timing controller 106 and correspondingly generate the data voltages based on the gamma voltages selected from the gamma control circuit 108. The source driver 102 may include a plurality of channels each coupled to one or more columns of pixels on the display panel 100, depending on whether the demultiplexer control is applied. Each channel may be composed of a shift register, latch circuit, digital-to-analog converter (DAC) and/or output buffer, but not limited thereto.

The gate driver 104 (or called scan driver) is configured to output gate control signals and emission control signals to the target pixels on the display panel 100 through the gate lines. In an embodiment, the gate driver 104 may be in the form of a gate on array (GOA) circuit which is deployed on the substrate of the display panel 100. The GOA circuit may generate the gate control signals and emission control signals by receiving gate/emission control clocks and gate/emission start pulses from the timing controller 106.

The timing controller 106 is configured to control the timing associated with the operations of the source driver 102 and the gate driver 104. In an embodiment, the timing controller 106 may receive display grayscale data from a front-end video source, perform necessary video processing on the grayscale data, and then send the grayscale data to the source driver 102. In an embodiment, the timing controller 106 along with the source driver 102 (and/or the gate driver 104) may be implemented in an integrated circuit (IC) to realize a display driver IC (DDIC).

The gamma control circuit 108 may include one or more resistor strings for generating a plurality of gamma voltages to be selected by the source driver 102 based on the values of the grayscale data. The gamma control circuit 108 may be integrated with the timing controller 106 and/or the source driver 102, or may include a stand-alone gamma voltage generator.

In various embodiments, each pixel of the display panel 100 may have an active matrix pixel circuit, which may be composed of a LED/OLED and several transistors, and may be coupled to the source drive 102 through a data line and coupled to the gate driver 104 through one or more gate lines. The display data voltages are delivered to the pixels through the data lines and stored in the capacitors of the pixels based on the scan control row by row, where each pixel receives the corresponding data voltage when scanned by the gate/emission control signals through the gate lines.

Figure 2:
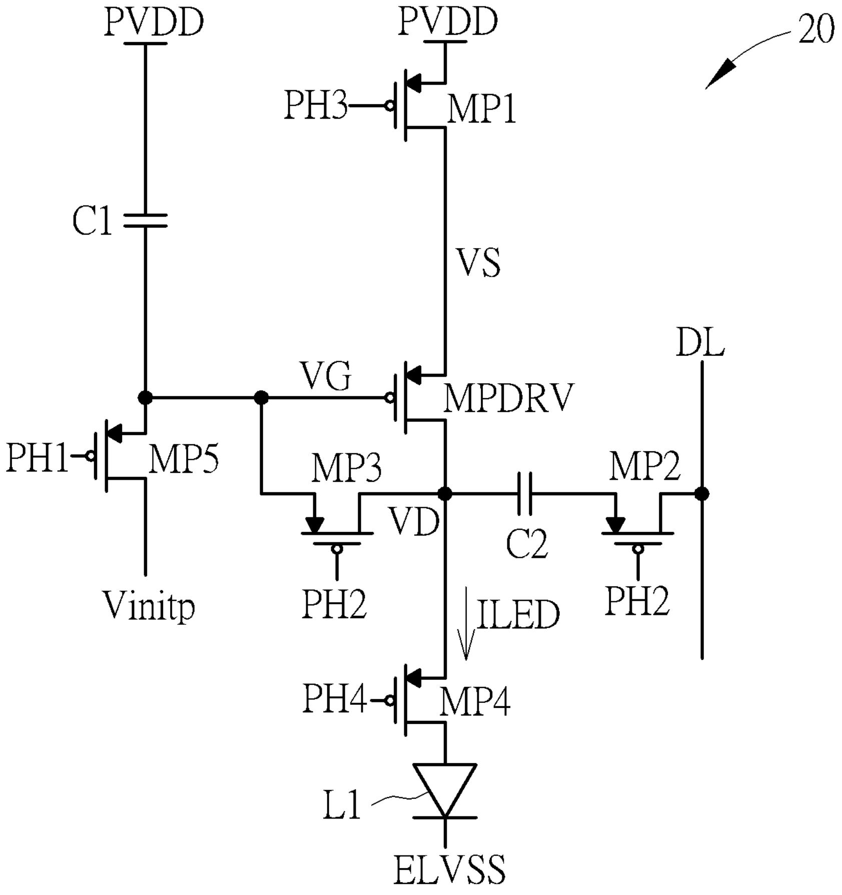
FIG. 2 is a schematic diagram of a pixel circuit of a display panel according to an embodiment of the present invention.

FIG. 2 is a schematic diagram of a pixel circuit 20 of a display panel (such as the display panel 100 shown in FIG. 1) according to an embodiment of the present invention. The pixel circuit 20 includes a driving transistor MPDRV, multiple control transistors MP1-MP5, capacitors C1 and C2, and a light emitting device L1, to realize a 6T2C structure. The pixel circuit 20 may be operated by receiving two power supply voltages PVDD and ELVSS, where PVDD may be a positive power supply voltage and ELVSS may be a negative power supply voltage or ground voltage. In an exemplary embodiment, PVDD may be equal to 5V and ELVSS may be equal to −5V.

The driving transistor MPDRV is used to output a driving current ILED to control the light emitting device L1. More specifically, the driving transistor MPDRV may generate a drain current according to a received display data Vdata (which may be in the form of a data voltage), and the drain current may serve as the driving current ILED to be output to drive the light emitting device L1 to emit light.

Other transistors MP1-MP5 of the pixel circuit 20 may serve as switches for controlling the operations of the driving transistor MPDRV and the light emitting device L1. These transistors MP1-MP5 may be deployed and controlled appropriately to cancel the deviations of the driving current ILED generated from the offset of the threshold voltage of the driving transistor MPDRV. In this embodiment, these transistors MP1-MP5 may receive control signals PH1-PH4 to realize the offset cancellation in several phases. The control signals PH1-PH4 may be received from a GOA circuit through the gate lines, where the GOA circuit may be implemented in the gate driver 104 as shown in FIG. 1.

The capacitor C1 is coupled between the gate terminal of the driving transistor MPDRV and the power supply terminal that supplies the power supply voltage PVDD. More specifically, a first terminal of the capacitor C1 may be coupled to the gate terminal of the driving transistor MPDRV, and a second terminal of the capacitor C1 may be coupled to the power supply terminal of PVDD, which is further coupled to the upper terminal of the driving transistor MPDRV (through the control transistor MP1), where the upper terminal of the driving transistor MPDRV may be its source terminal according to the current direction.

The capacitor C2 is coupled between the lower terminal of the driving transistor MPDRV and the control transistor MP2. More specifically, a first terminal of the capacitor C2 may be coupled to the lower terminal of the driving transistor MPDRV, and a second terminal of the capacitor C2 may be coupled to the control transistor MP2, where the lower terminal of the driving transistor MPDRV may be its drain terminal according to the current direction. When the display data Vdata is received, the information associated with the display data Vdata may be stored in the capacitors C1 and/or C2. The capacitors C1 and/or C2 may also store the information of the threshold voltage of the driving transistor MPDRV.

The control transistor MP1 is coupled to the upper terminal of the driving transistor MPDRV. In detail, a first terminal of the control transistor MP1 may be coupled to the power supply terminal to receive the power supply voltage PVDD, a second terminal of the control transistor MP1 may be coupled to the upper terminal of the driving transistor MPDRV, and the gate terminal of the control transistor MP1 may receive the control signal PH3. The control transistor MP1 may serve as a switch for controlling the pixel circuit 20 to receive the power supply voltage PVDD.

The control transistor MP2 is coupled to the lower terminal of the driving transistor MPDRV through the capacitor C2. In detail, a first terminal of the control transistor MP2 may be coupled to the capacitor C2 and the lower terminal of the driving transistor MPDRV, a second terminal of the control transistor MP2 may be coupled to a data line DL to receive the display data Vdata, and the gate terminal of the control transistor MP2 may receive the control signal PH2. The control transistor MP2 may serve as a switch for controlling display data reception, to control the pixel circuit 20 to receive the display data Vdata.

The control transistor MP3 is coupled between the lower terminal of the driving transistor MPDRV and the gate terminal of the driving transistor MPDRV. In detail, a first terminal of the control transistor MP3 may be coupled to the lower terminal of the driving transistor MPDRV, a second terminal of the control transistor MP3 may be coupled to the gate terminal of the driving transistor MPDRV, and the gate terminal of the control transistor MP3 may receive the control signal PH2. The control transistor MP3 may serve as a switch for initialization and compensation information writing. More specifically, the control transistor MP3 may be connected with the driving transistor MPDRV to form a diode-connected structure, to help initialize the driving transistor MPDRV to an appropriate voltage in each operation cycle, allowing the input data Vdata to be successfully received by the driving transistor MPDRV after initialization.

The control transistor MP4 is coupled between the lower terminal of the driving transistor MPDRV and the light emitting device L1. In detail, a first terminal of the control transistor MP4 may be coupled to the lower terminal of the driving transistor MPDRV, a second terminal of the control transistor MP4 may be coupled to the light emitting device L1, and the gate terminal of the control transistor MP4 may receive the control signal PH4. The control transistor MP4 may serve as a switch for controlling light emission of the pixel circuit 20. More specifically, the control transistor MP4 may be used to control the driving current ILED generated by the driving transistor MPDRV to flow to the light emitting device L1, in order to drive the light emitting device L1 to emit light.

The control transistor MP5 is coupled to the gate terminal of the driving transistor MPDRV. In detail, a first terminal of the control transistor MP5 may be coupled to the gate terminal of the driving transistor MPDRV, a second terminal of the control transistor MP5 may be coupled to a reset input terminal to receive an initial voltage Vinitp, and the gate terminal of the control transistor MP5 may receive the control signal PH1. The control transistor MP5 may serve as a switch for controlling the initialization or reset of the driving transistor MPDRV, where the control transistor MP5 may form a signal path for forwarding the initial voltage Vinitp to the driving transistor MPDRV to initialize the driving transistor MPDRV.

The light emitting device L1 is coupled between the driving transistor MPDRV and the power supply terminal that supplies the power supply voltage ELVSS. In detail, a first terminal of the light emitting device L1 may be coupled to the lower terminal of the driving transistor MPDRV through the control transistor MP4, and a second terminal of the light emitting device L1 may be coupled to the power supply terminal of ELVSS. The light emitting device L1, which is configured to emit light as being driven by the driving current ILED received from the driving transistor MPDRV, may be any device capable of emitting light by receiving currents, such as an OLED or a micro-OLED.

Figure 3A:
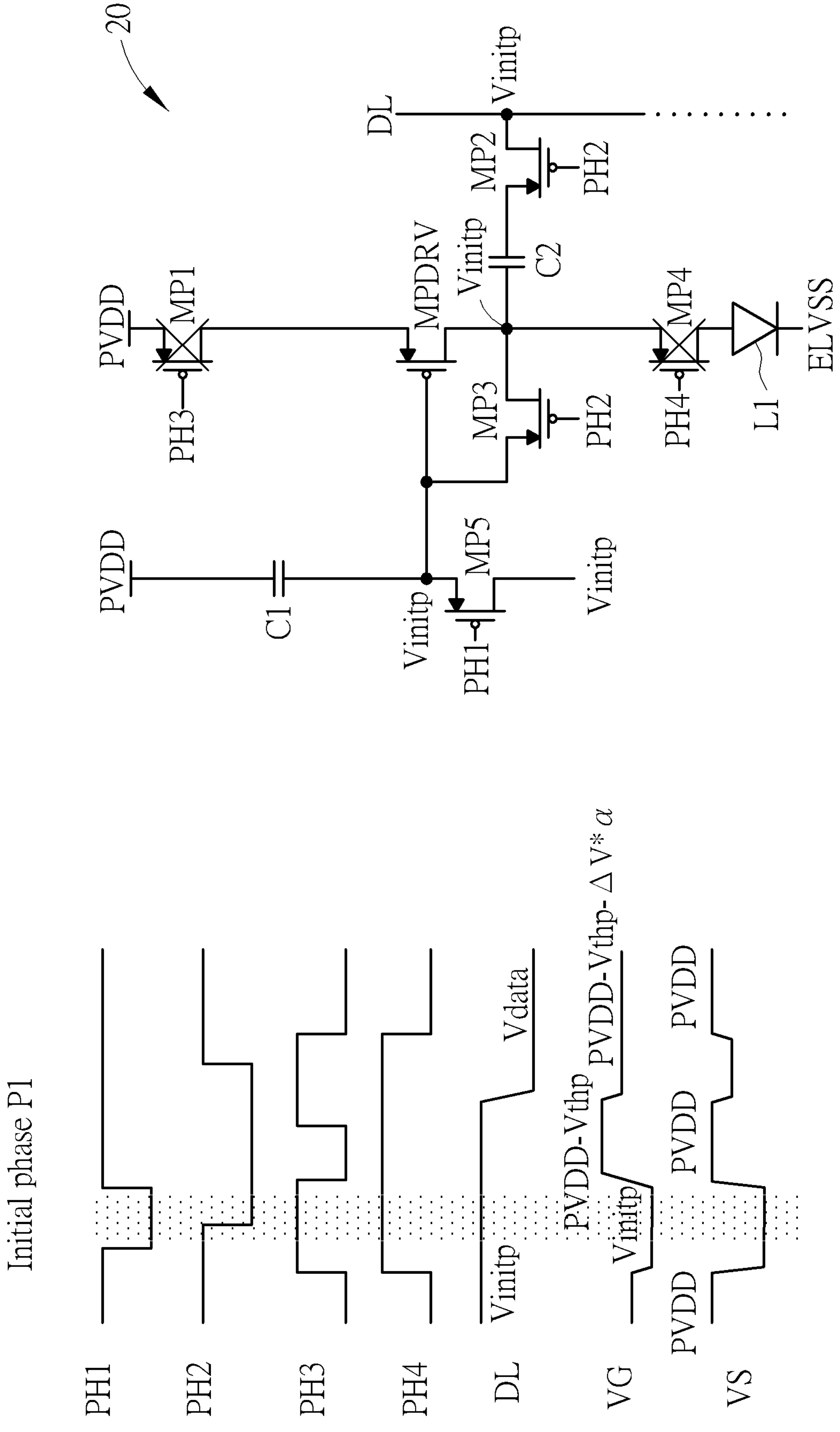
FIGS. 3A-3D illustrate the circuit implementations and related waveforms of the control signals in the pixel circuit in different phases.
Figure 3B:
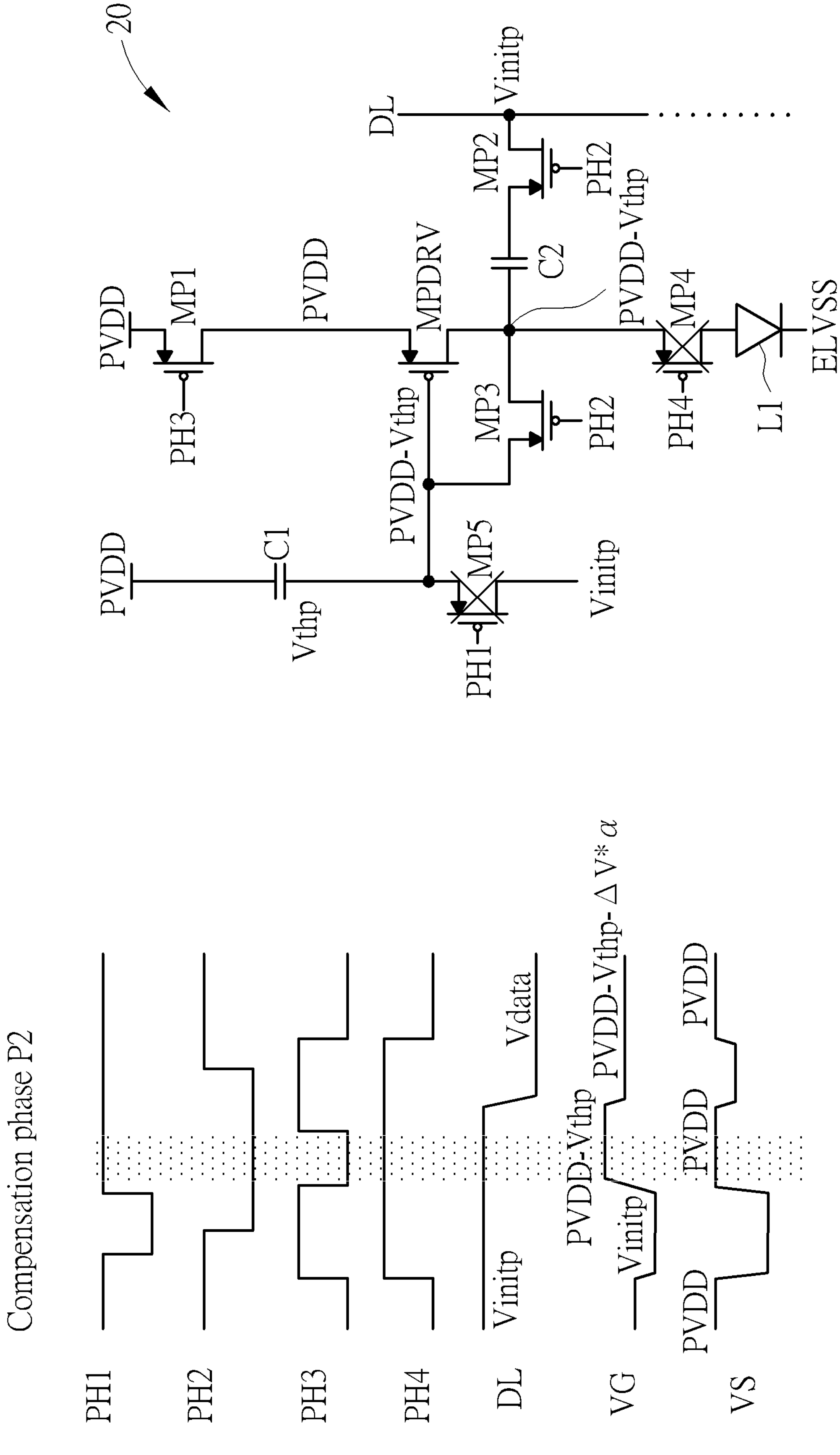
Figure 3C:
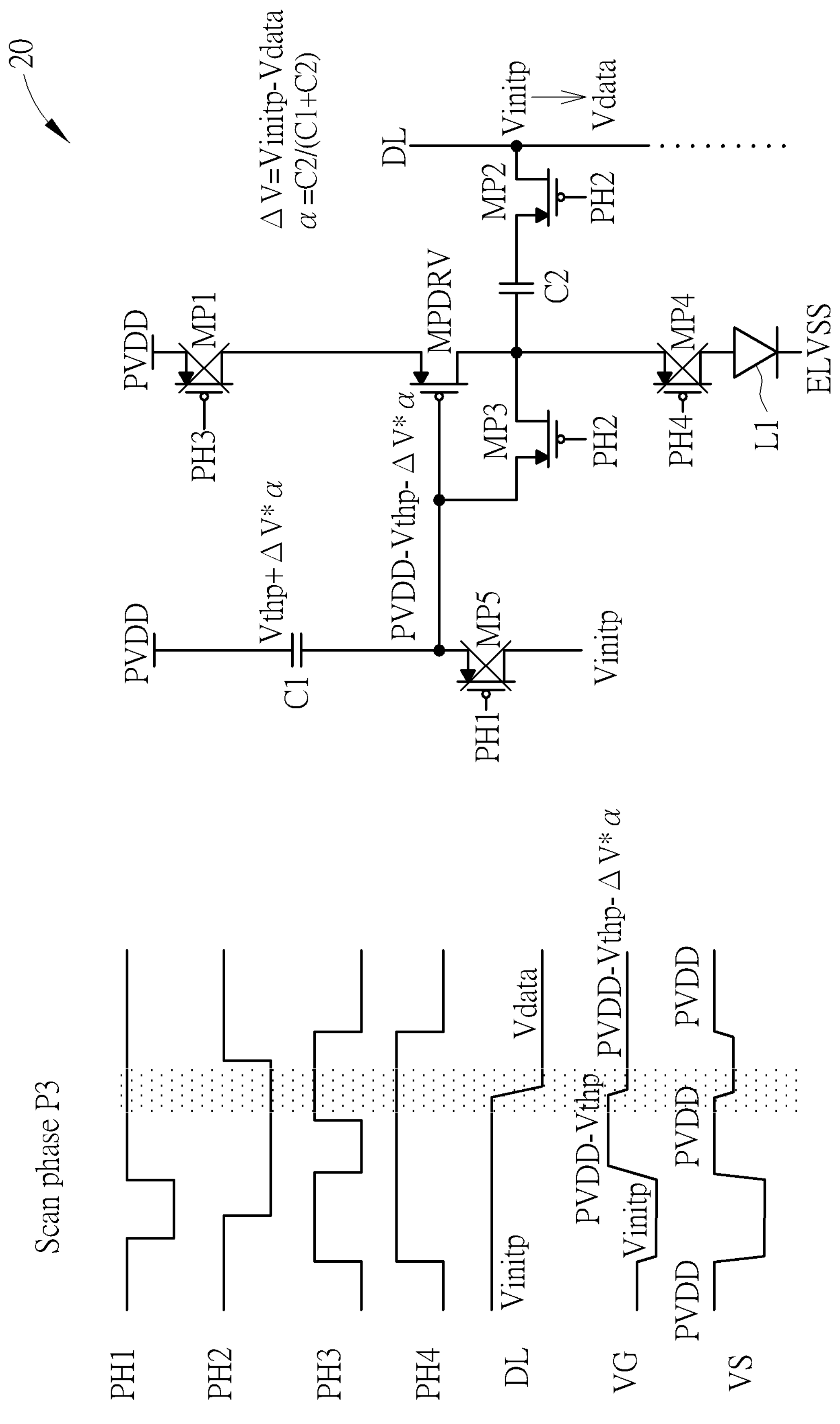
Figure 3D:
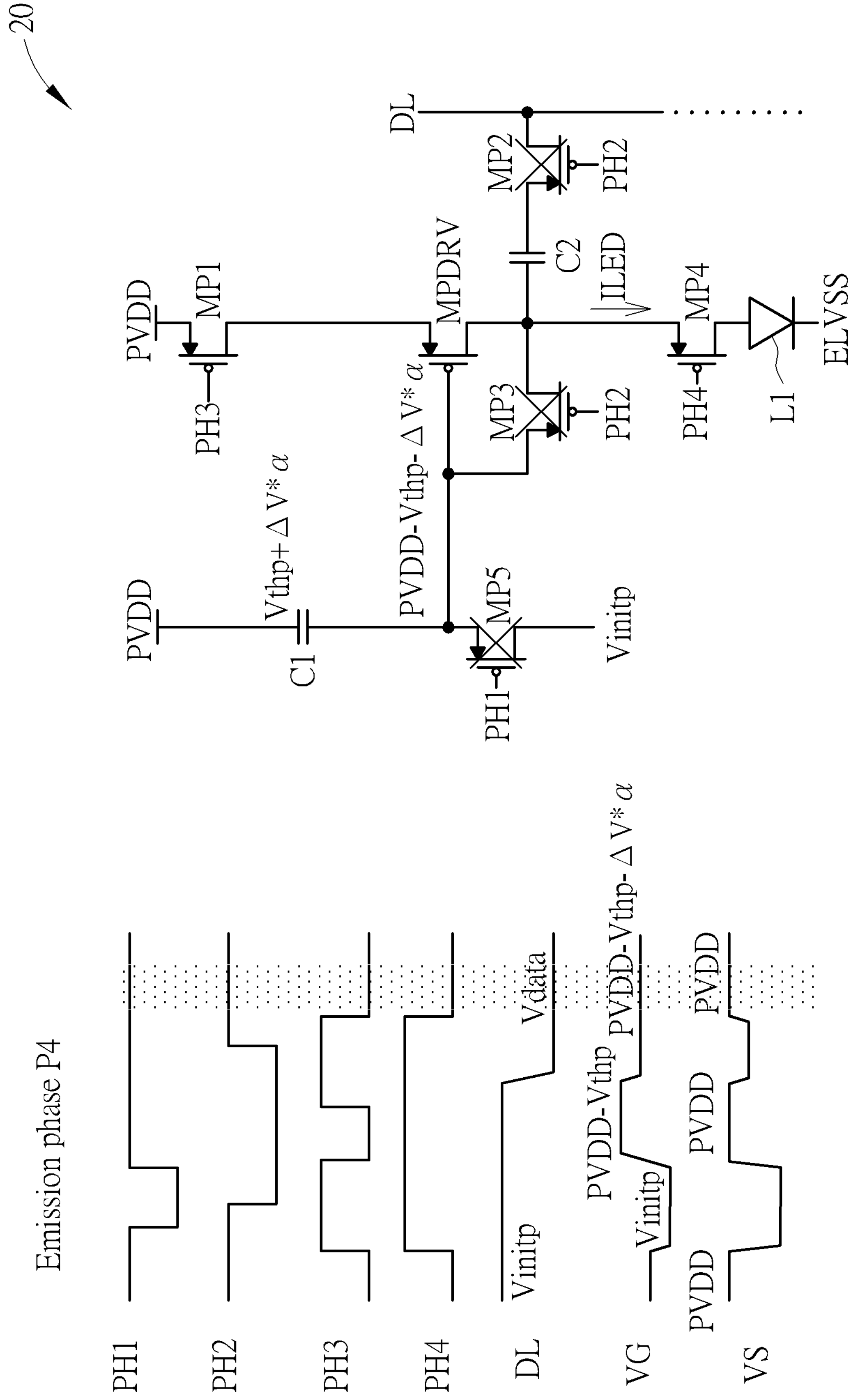

The operations of the pixel circuit 20 include four phases: an initial phase, a compensation phase, a scan phase, and an emission phase. FIGS. 3A-3D illustrate the circuit implementations and related waveforms of the control signals in the pixel circuit 20 in different phases, where these control signals include the control signals PH1-PH4 for controlling the control transistors MP1-MP5 and the gate voltage VG and the source voltage VS of the driving transistor MPDRV. FIG. 3A shows the operations of the initial phase, FIG. 3B shows the operations of the compensation phase, FIG. 3C shows the operations of the scan phase, and FIG. 3D shows the operations of the emission phase. In this embodiment, the control transistors MP1-MP5 are all PMOS transistors, and thus the control signals PH1-PH4 in low level may turn on the corresponding transistors and in high level may turn off the corresponding transistors.

As shown in FIG. 3A, in the initial phase P1 (also called reset phase or precharge phase), the control transistors MP2, MP3 and MP5 are on, and the control transistors MP1 and MP4 are off. The initial voltage Vinitp may be input to the pixel circuit 20 from the reset input terminal through the control transistor MP5. Since the control transistors MP3 and MP5 are both conducted, the gate voltage VG and the drain voltage VD of the driving transistor MPDRV are initialized or reset to the initial voltage Vinitp. The control transistors MP1 and MP4 are turned off to prevent a current conducting path through the driving transistor MPDRV and the light emitting device L1 to generate unwanted current consumption and abnormal light emission. Simultaneously, the data line DL coupled to the pixel circuit 20 may also be pulled to the initial voltage Vinitp or controlled to be at any appropriate voltage level. The electric charges associated with the initial voltage Vinitp may be stored in the capacitors C1 and C2.

As shown in FIG. 3B, in the compensation phase P2, the control transistors MP1, MP2 and MP3 are on, and the control transistors MP4 and MP5 are off. The compensation phase P2 is used for generating the compensation information and writing the compensation information into the capacitors C1 and/or C2. Since the control transistor MP1 is conducted, the source voltage VS of the driving transistor MPDRV may be pulled to the power supply voltage PVDD, causing that the gate voltage VG of the driving transistor MPDRV is charged to PVDD-Vthp to turn off the driving transistor MPDRV, where Vthp is the threshold voltage of the driving transistor MPDRV. The drain voltage VD of the driving transistor MPDRV may also be pulled to PVDD-Vthp through the conducted control transistor MP3. The electric charges corresponding to the voltage PVDD-Vthp are thereby stored in the capacitors C1 and/or C2. Note that since the capacitor C1 is coupled between the gate terminal and the source (upper) terminal of the driving transistor MPDRV (through the control transistor MP1), the cross-voltage of the capacitor C1 will become Vthp at the end of the compensation phase P2.

As shown in FIG. 3C, in the scan phase P3 (also called data writing phase), the control transistors MP2 and MP3 are on, and the control transistors MP1, MP4 and MP5 are off. The display data Vdata is input to the pixel circuit 20 from the data line DL through the control transistor MP2. More specifically, the voltage at the data line DL may vary from the initial voltage Vinitp to the display data voltage Vdata, and the voltage variation $\Delta V$ on the data line DL may be coupled to the driving transistor MPDRV through the capacitor C2, with a ratio determined according to the values of the capacitors C1 and C2, to generate a smaller voltage variation on the drain terminal of the driving transistor MPDRV. This smaller voltage variation is further forwarded to the gate terminal of the driving transistor MPDRV from its drain terminal through the conducted control transistor MP3. In an exemplary embodiment, the display data Vdata may range between 3V and 4V, while the initial voltage Vinitp may be approximately equal to 4V, which is slightly higher than the voltage of the display data Vdata.

As shown in FIG. 3D, in the emission phase P4, the control transistors MP1 and MP4 are on, and the control transistors MP2, MP3 and MP5 are off. The conducted control transistors MP1 and MP4 allow the driving current ILED generated by the driving transistor MPDRV to be forwarded to the light emitting device L1; hence, the light emitting device L1 will emit light based on the display data Vdata. Since the information of the data voltage Vdata has been stored in the capacitors C1 and C2 at the end of the scan phase P3, the driving current ILED may keep at its target level during the emission time.

In this embodiment, in the scan phase P3, the display data Vdata is coupled through the capacitor C2 with a ratio α, where α is equal to C2/(C1+C2). The coupled electric charges are generated at the driving transistor MPDRV and stored into the capacitor C1. This generates a voltage variation equal to ΔV×α on the drain terminal and the gate terminal of the driving transistor MPDRV. Therefore, the electric charges stored in the capacitor C1 may become Vthp+ΔV×α, and the gate voltage VG of the driving transistor MPDRV may be equal to:

$$VG=PVDD-Vthp-\Delta V\times\alpha.$$

The driving current ILED generated in the emission phase P4 may be calculated as follows:

$$\begin{aligned} ILED &= K'(Vsg - Vthp)^2 \\ &= K'(PVDD - (PVDD - Vthp - \Delta V \times \alpha) - Vthp)^2 \\ &= K'(\Delta V \times \alpha)^2; \end{aligned} \tag{1}$$

where $$\Delta V = Vinitp - Vdata;$$

$$\alpha = C2/(C1+C2);$$

where K' represents the gain factor of the driving transistor MPDRV. The details of the gain factor K' are well known by a skilled person and will not be narrated herein.

As can be seen in Equation (1), the value of the driving current ILED only includes a signal dependent term consisting of the input data Vdata and the initial voltage Vinitp, and will not depend on the threshold voltage Vthp, which means that the offset of the threshold voltage Vthp between pixels will not influence the current magnitude and thus will not influence the brightness of the light emitting device L1.

In addition, in this embodiment, the input voltage variation ΔV is multiplied by a ratio α when coupled to the driving transistor MPDRV to be used to determine the driving current ILED; and this is different from the conventional pixel circuit where the input voltage variation is directly applied to determine the driving current without being modified by a ratio. This improves the operational voltage range of the display data Vdata. The value of the ratio may be well controlled by allocating appropriate values of the capacitors C1 and C2 in the pixel circuit.

As mentioned above, in the silicon-based implementation, 256 grayscales should be generated within an operational voltage range between 200 mV-300 mV, and thus one step voltage may be about 1 mV for each gray level. In comparison, based on the pixel circuit of the present invention, the input voltage variation ΔV may be expanded by applying appropriate values of the capacitors C1 and C2; that is, the possible range of the display data voltage Vdata may be expanded. For example, if the ratio α to be multiplied with the display data Vdata equals 3, the operational voltage range may be approximately tripled. This significantly reduces the burden of the design of grayscale-to-voltage mapping.

Please note that the present invention aims at providing a novel pixel circuit capable of canceling the offset of threshold voltages and applicable to the silicon-based implementation. Those skilled in the art may make modifications and alterations accordingly. For example, in the pixel circuit, the light emitting device may be an OLED, a micro-OLED, or any other possible device capable of light emission function. The pixel circuit structure of the present invention is preferably applied to a micro-OLED panel implemented with the CMOS process, but not limited thereto. In fact, the pixel circuit of the present invention may be applied to any self-luminous panel, which includes, but not limited to, a mini-LED panel, micro-LED panel, ultra-LED panel, OLED panel, and micro-OLED panel.

In addition, the pixel circuit structure as shown in FIG. 2 is one of various implementations of the present invention. In another embodiment, the detailed pixel structure may be modified based on system requirements. For example, in several embodiments, the positions and connections of one or more control transistors may be modified.

Figure 4:
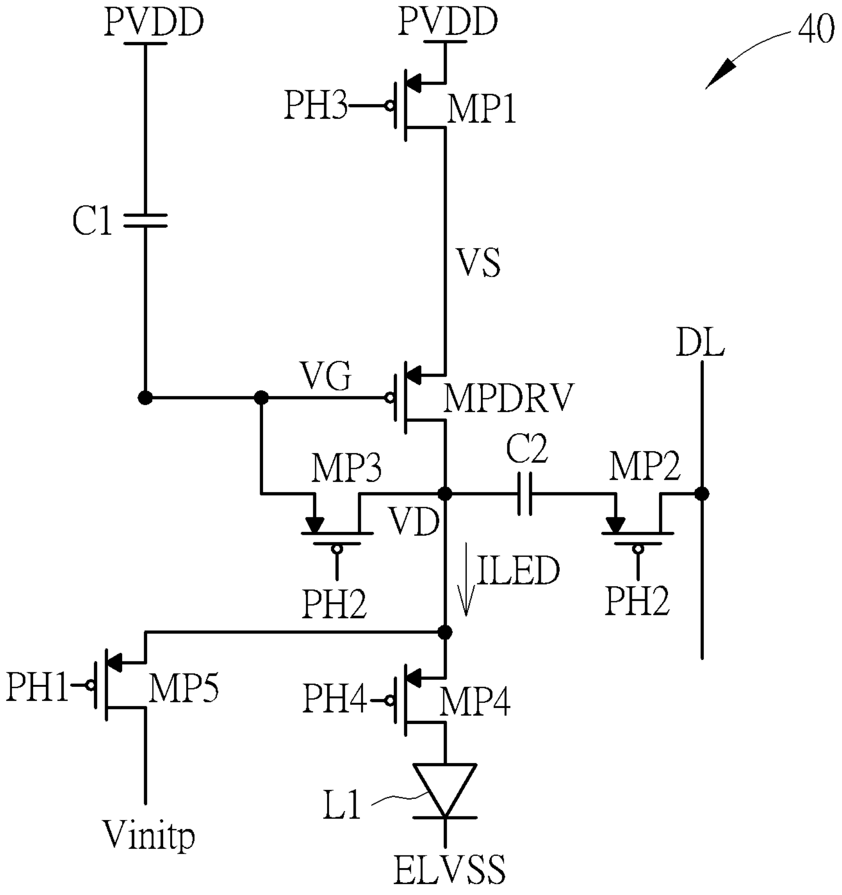
FIG. 4 is a schematic diagram of another pixel circuit according to an embodiment of the present invention.

FIG. 4 is a schematic diagram of another pixel circuit 40 according to an embodiment of the present invention. The structure of the pixel circuit 40 is similar to the structure of the pixel circuit 20 shown in FIG. 2, so signals and elements having similar functions are denoted by the same symbols. The difference between the pixel circuit 40 and the pixel circuit 20 is that, in the pixel circuit 40, the control transistor MP5 for receiving the initial voltage Vinitp is directly connected to the lower terminal of the driving transistor MPDRV rather than the gate terminal of the driving transistor MPDRV. In such a situation, the initial voltage Vinitp may be forwarded to the lower terminal of the driving transistor MPDRV in the initial phase P1. Since the control transistor MP3 is conducted in the initial phase P1, the initial voltage Vinitp may still be applied to reset or initialize the driving transistor MPDRV in a similar manner. Other implementations and operations of the pixel circuit 40 are similar to those of the pixel circuit 20, and will be omitted herein.

Note that the pixel circuits in the above embodiments apply all PMOS transistors to control the light emitting device, but the present invention is not limited thereto. In another embodiment, similar implementations may be realized by using NMOS transistors or combinations of PMOS and NMOS transistors, where the levels of the control signals and the initial voltage may be modified accordingly.

Figure 5:
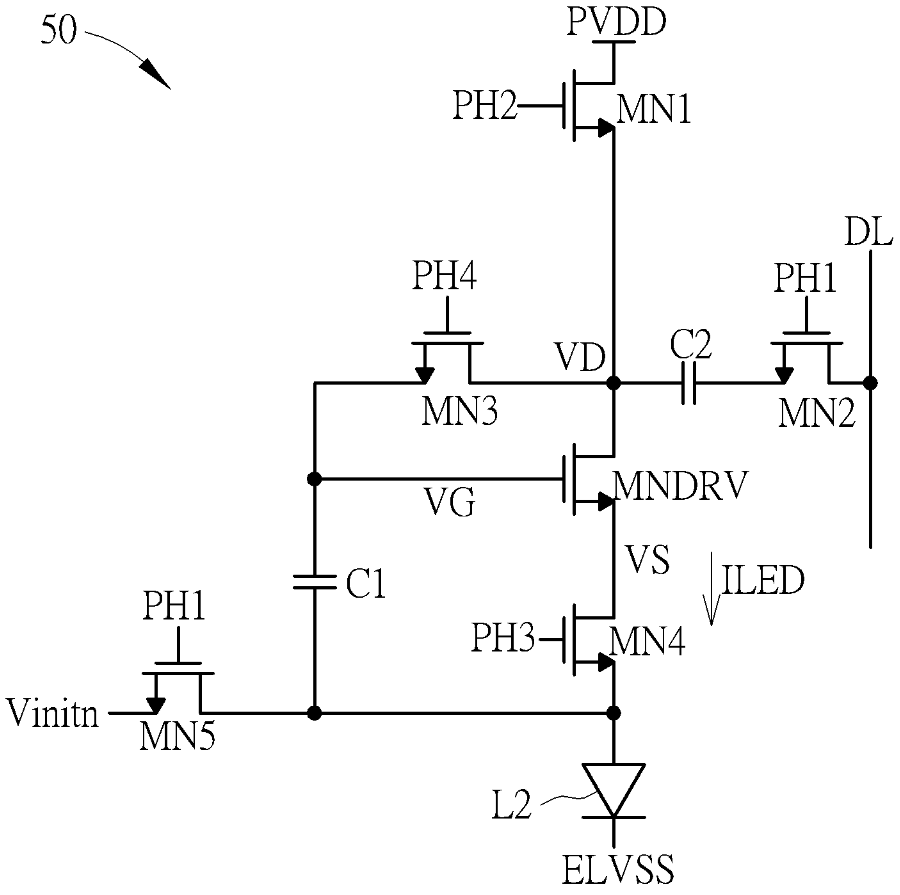
FIG. 5 is a schematic diagram of a pixel circuit of a display panel according to an embodiment of the present invention.

FIG. 5 is a schematic diagram of a pixel circuit 50 of a display panel (such as the display panel 100 shown in FIG. 1) according to an embodiment of the present invention. The pixel circuit 50 includes a driving transistor MNDRV, multiple control transistors MN1-MN5, capacitors C1 and C2, and a light emitting device L2, to realize a 6T2C structure. Similarly, the pixel circuit 50 may also be operated by receiving two power supply voltages PVDD and ELVSS, where PVDD may be a positive power supply voltage and ELVSS may be a negative power supply voltage or ground voltage. Different from the pixel circuit 20 which is composed of all PMOS transistors, the pixel circuit 50 applies all NMOS transistors for light emission and offset cancelation control.

In the pixel circuit 50, the driving transistor MNDRV is used to output a driving current ILED to control the light emitting device L2 based on the received display data Vdata. Other transistors MN1-MN5 of the pixel circuit 50 may serve as switches for controlling the operations of the driving transistor MNDRV and the light emitting device L2. These transistors MN1-MN5 may be deployed and controlled appropriately to cancel the deviations of the driving current ILED generated from the offset of the threshold voltage of the driving transistor MNDRV. These transistors MN1-MN5 may receive control signals PH1-PH4 to realize the offset cancellation in several phases. The control signals PH1-PH4 may be received from a GOA circuit through the gate lines, where the GOA circuit may be implemented in the gate driver 104 as shown in FIG. 1.

The capacitor C1 is coupled to the gate terminal of the driving transistor MNDRV and the control transistor MN4. More specifically, a first terminal of the capacitor C1 may be coupled to the gate terminal of the driving transistor MNDRV, and a second terminal of the capacitor C1 may be coupled to the lower terminal of the control transistor MN4, which is further coupled to the lower terminal of the driving transistor MNDRV, where the lower terminal of the driving transistor MNDRV may be its source terminal according to the current direction.

The capacitor C2 is coupled between the upper terminal of the driving transistor MNDRV and the control transistor MN2. More specifically, a first terminal of the capacitor C2 may be coupled to the upper terminal of the driving transistor MNDRV, and a second terminal of the capacitor C2 may be coupled to the control transistor MN2, where the upper terminal of the driving transistor MNDRV may be its drain terminal according to the current direction. When the display data Vdata is received, the information associated with the display data Vdata may be stored in the capacitors C1 and/or C2. The capacitors C1 and/or C2 may also store the information of the threshold voltage of the driving transistor MNDRV.

The control transistor MN1 is coupled to the upper terminal of the driving transistor MNDRV. In detail, a first terminal of the control transistor MN1 may be coupled to the power supply terminal to receive the power supply voltage PVDD, a second terminal of the control transistor MN1 may be coupled to the upper terminal of the driving transistor MNDRV, and the gate terminal of the control transistor MN1 may receive the control signal PH2. The control transistor MN1 may serve as a switch for controlling the pixel circuit 50 to receive the power supply voltage PVDD.

The control transistor MN2 is coupled to the upper terminal of the driving transistor MNDRV through the capacitor C2. In detail, a first terminal of the control transistor MN2 may be coupled to the capacitor C2 and the upper terminal of the driving transistor MNDRV, a second terminal of the control transistor MN2 may be coupled to a data line DL to receive the display data Vdata, and the gate terminal of the control transistor MN2 may receive the control signal PH1. The control transistor MN2 may serve as a switch for controlling display data reception, to control the pixel circuit 50 to receive the display data Vdata.

The control transistor MN3 is coupled between the upper terminal of the driving transistor MNDRV and the gate terminal of the driving transistor MNDRV. In detail, a first terminal of the control transistor MN3 may be coupled to the upper terminal of the driving transistor MNDRV, a second terminal of the control transistor MN3 may be coupled to the gate terminal of the driving transistor MNDRV, and the gate terminal of the control transistor MN3 may receive the control signal PH4. The control transistor MN3 may serve as a switch for initialization and compensation information writing. More specifically, the control transistor MN3 may be connected with the driving transistor MNDRV to form a diode-connected structure, to help initialize the driving transistor MNDRV to an appropriate voltage in each operation cycle, allowing the input data Vdata to be successfully received by the driving transistor MNDRV after initialization.

The control transistor MN4 is coupled between the lower terminal of the driving transistor MNDRV and the light emitting device L2. In detail, a first terminal of the control transistor MN4 may be coupled to the lower terminal of the driving transistor MNDRV, a second terminal of the control transistor MN4 may be coupled to the light emitting device L2, and the gate terminal of the control transistor MN4 may receive the control signal PH3. The control transistor MN4 may serve as a switch for controlling light emission of the pixel circuit 50. More specifically, the control transistor MN4 may be used to control the driving current ILED generated by the driving transistor MNDRV to flow to the light emitting device L2, in order to drive the light emitting device L2 to emit light.

The control transistor MN5 is coupled to the capacitor C1, the control transistor MN4 and the light emitting device L2. In detail, a first terminal of the control transistor MN5 may be coupled to the capacitor C1, the control transistor MN4 and the light emitting device L2, a second terminal of the control transistor MN5 may be coupled to a reset input terminal to receive an initial voltage Vinitn, and the gate terminal of the control transistor MN5 may receive the control signal PH1. The control transistor MN5 may serve as a switch for controlling the initialization or reset of the driving transistor MNDRV, where the control transistor MN5 may form a signal path for forwarding the initial voltage Vinitn to the light emitting device L2 to initialize the light emitting device L2.

The light emitting device L2 is coupled between the driving transistor MNDRV and the power supply terminal that supplies the power supply voltage ELVSS. In detail, a first terminal of the light emitting device L2 may be coupled to the lower terminal of the driving transistor MNDRV through the control transistor MN4, and a second terminal of the light emitting device L2 may be coupled to the power supply terminal of ELVSS. The light emitting device L2, which is configured to emit light as being driven by the driving current ILED received from the driving transistor MNDRV, may be any device capable of emitting light by receiving currents, such as an OLED or a micro-OLED.

Figure 6A:
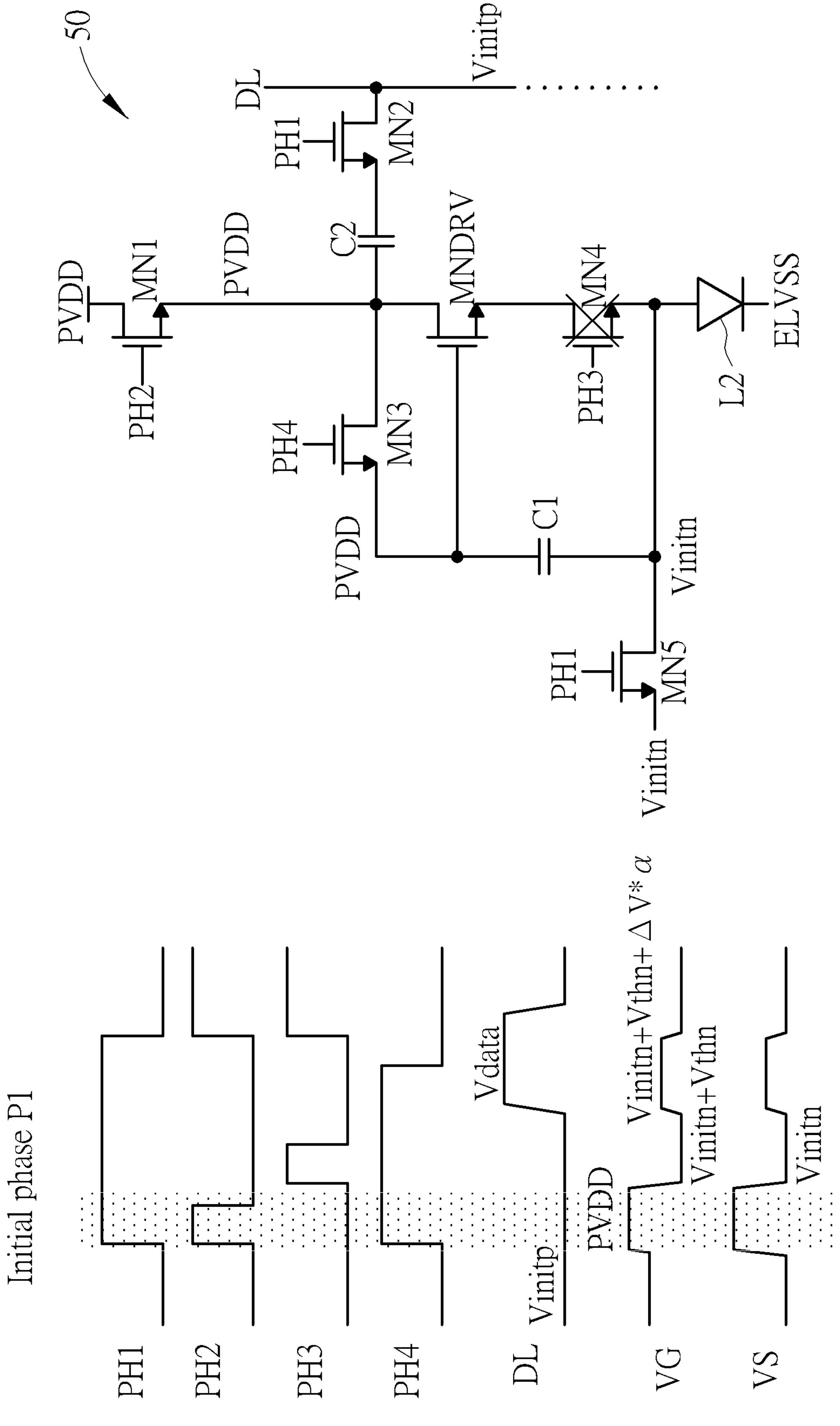
FIGS. 6A-6D illustrate the circuit implementations and related waveforms of the control signals in the pixel circuit in different phases.
Figure 6B:
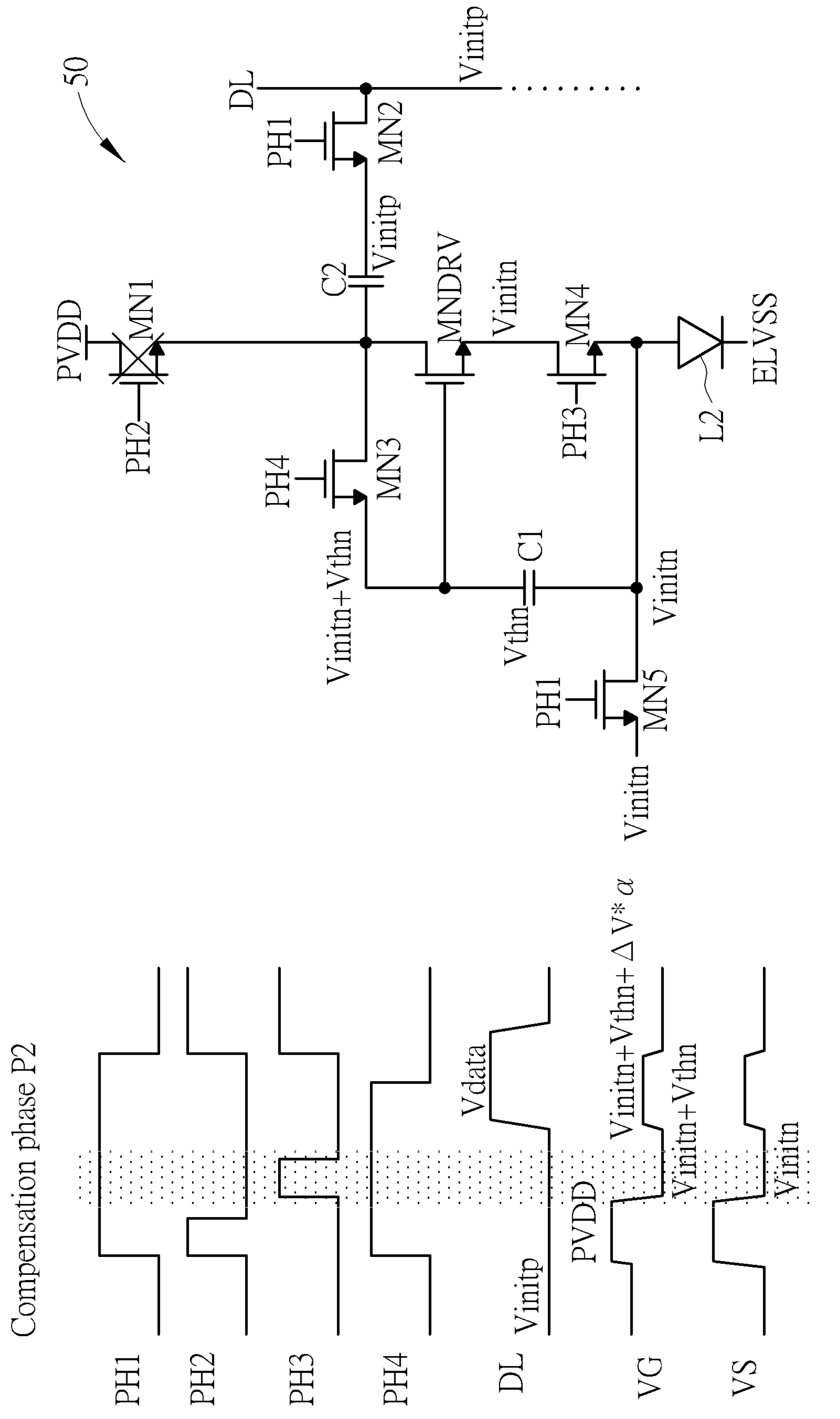
Figure 6C:
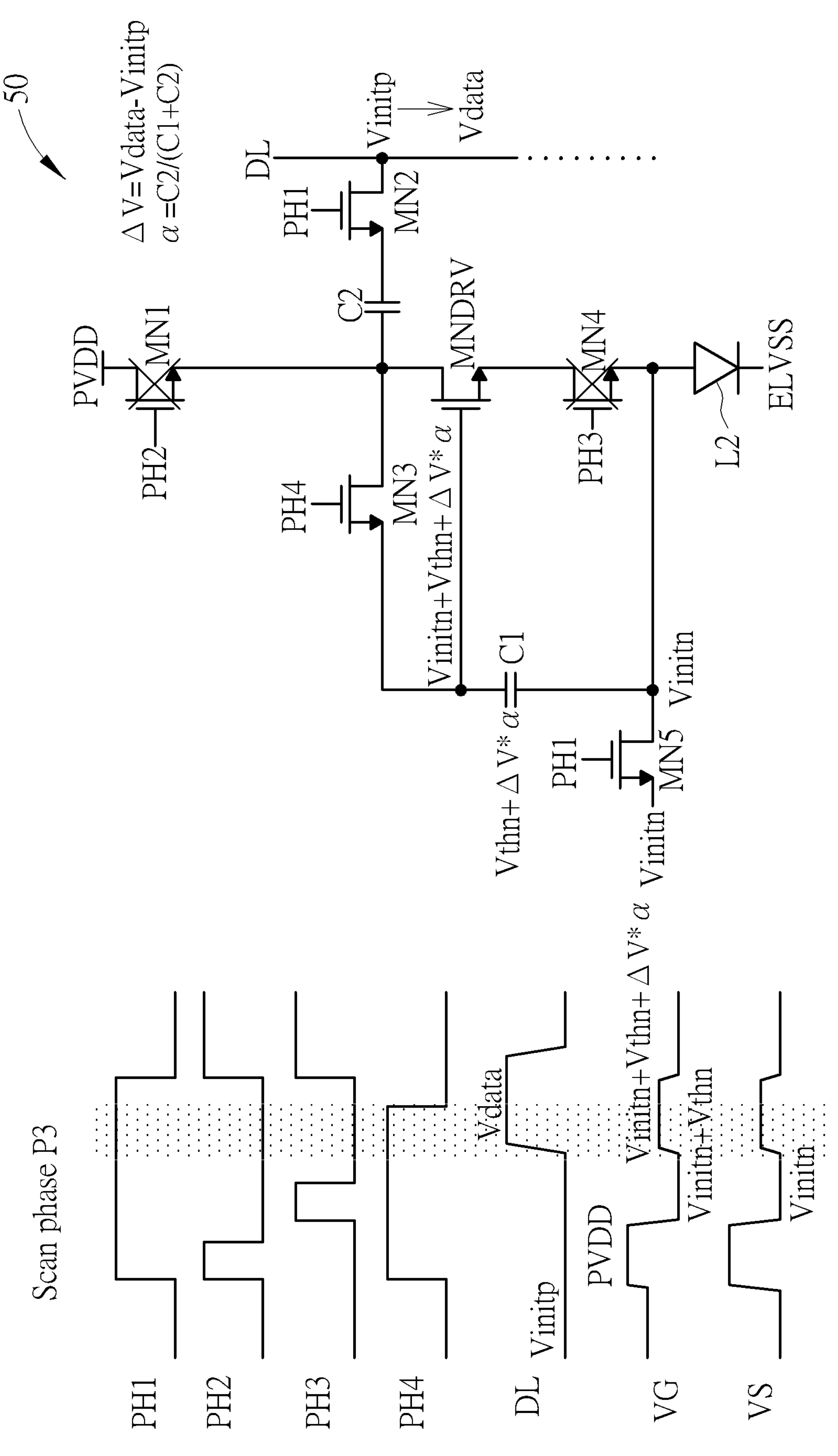
Figure 6D:
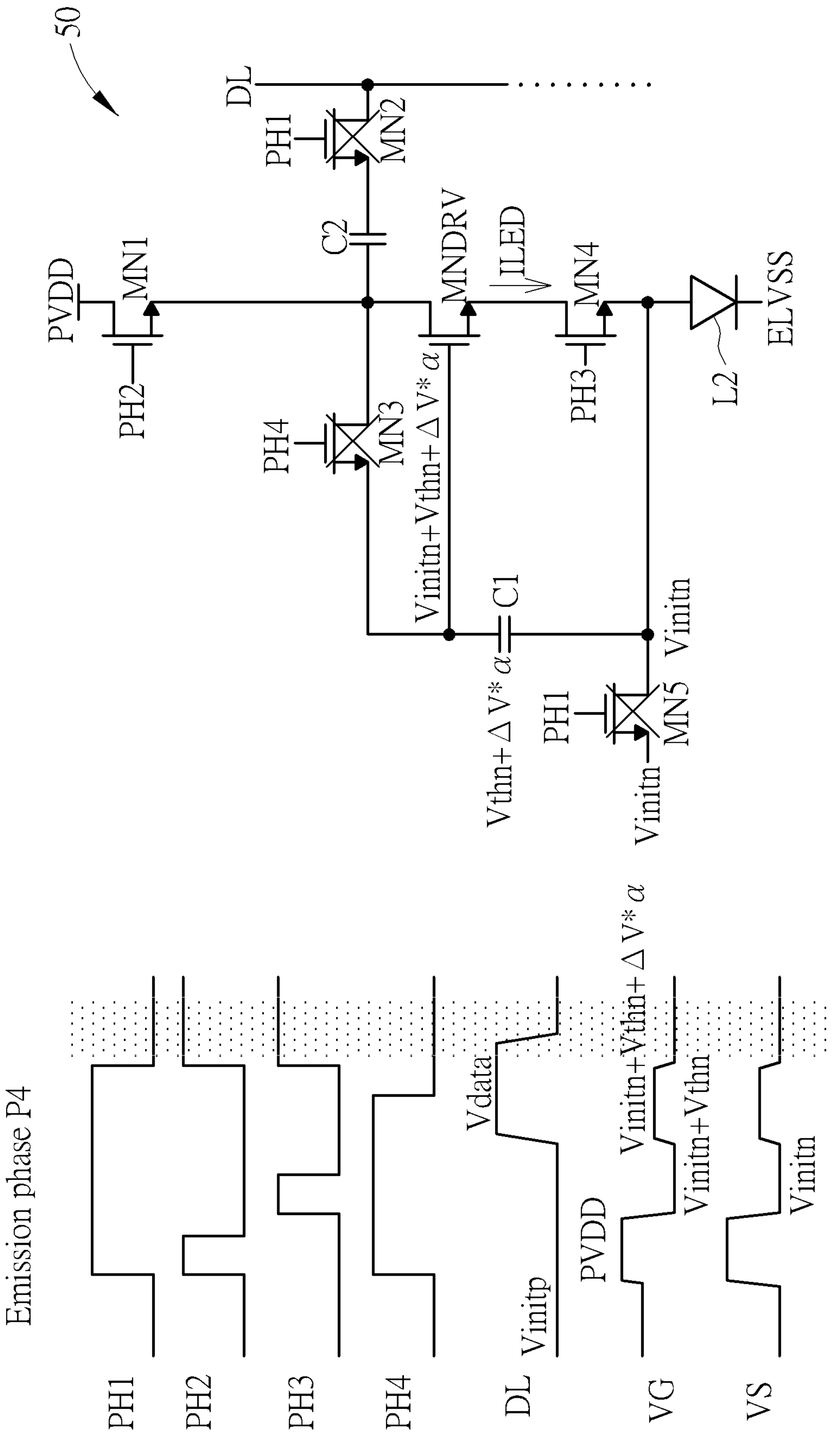

Similarly, the operations of the pixel circuit 50 include four phases: an initial phase, a compensation phase, a scan phase, and an emission phase. FIGS. 6A-6D illustrate the circuit implementations and related waveforms of the control signals (including PH1-PH4 for controlling the control transistors MN1-MN5 and the gate voltage VG and the source voltage VS of the driving transistor MNDRV) in the pixel circuit 50 in different phases. FIG. 6A shows the operations of the initial phase, FIG. 6B shows the operations of the compensation phase, FIG. 6C shows the operations of the scan phase, and FIG. 6D shows the operations of the emission phase. In this embodiment, the control transistors MN1-MN5 are NMOS transistors, and thus the control signals PH1-PH4 in high level may turn on the corresponding transistors and in low level may turn off the corresponding transistors.

As shown in FIG. 6A, in the initial phase P1, the control transistors MN1, MN2, MN3 and MN5 are on, and the control transistor MN4 is off. The initial voltage Vinitn may be input to the pixel circuit 50 from the reset input terminal through the control transistor MN5. The initial voltage Vinitn may be used to initialize the light emitting device L2. In this phase, since the control transistors MN1 and MN3 are both conducted, the gate voltage VG and the drain voltage VD of the driving transistor MNDRV are initialized or reset to the power supply voltage PVDD. The control transistor MN4 is turned off to prevent a current conducting path through the driving transistor MNDRV and the light emitting device L2 to generate unwanted current consumption and abnormal light emission. Simultaneously, the data line DL coupled to the pixel circuit 50 may be pulled to the initial voltage Vinitp or controlled to be at any appropriate voltage level. The electric charges associated with the initial voltages Vinitn and Vinitp may be stored in the capacitors C1 and C2. Note that the initial voltages Vinitn and Vinitp may have the same or different values. In an exemplary embodiment, the initial voltage Vinitn may be approximately equal to 0V, the initial voltage Vinitp may be approximately equal to 1V, and the display data Vdata may range between 1.5V and 3V. In this embodiment, the initial voltage Vinitp may be slightly lower than the voltage of the display data Vdata.

As shown in FIG. 6B, in the compensation phase P2, the control transistors MN2, MN3, MN4 and MN5 are on, and the control transistor MN1 is off. The compensation phase P2 is used for generating the compensation information and writing the compensation information into the capacitors C1 and/or C2. Since the control transistor MN4 is conducted, the source voltage VS of the driving transistor MNDRV may be pulled to the initial voltage Vinitn, causing that the gate voltage VG of the driving transistor MNDRV is discharged to Vinitn+Vthn to turn off the driving transistor MNDRV, where Vthn is the threshold voltage of the driving transistor MNDRV. The electric charges corresponding to the voltage Vinitn+Vthn are thereby stored in the capacitors C1 and/or C2. Note that since the capacitor C1 is coupled between the gate terminal and the source (lower) terminal of the driving transistor MNDRV (through the control transistor MN4), the cross-voltage of the capacitor C1 will become Vthn at the end of the compensation phase P2.

As shown in FIG. 6C, in the scan phase P3, the control transistors MN2, MN3 and MN5 are on, and the control transistors MN1 and MN4 are off. The display data Vdata is input to the pixel circuit 50 from the data line DL through the control transistor MN2. More specifically, the voltage at the data line DL may vary from the initial voltage Vinitp to the display data voltage Vdata, and the voltage variation ΔV on the data line DL may be coupled to the driving transistor MNDRV through the capacitor C2, with a ratio determined according to the values of the capacitors C1 and C2, to generate a smaller voltage variation on the drain terminal of the driving transistor MNDRV. This smaller voltage variation is further forwarded to the gate terminal of the driving transistor MNDRV from its drain terminal through the conducted control transistor MN3.

As shown in FIG. 6D, in the emission phase P4, the control transistors MN1 and MN4 are on, and the control transistors MN2, MN3 and MN5 are off. The conducted control transistors MN1 and MN4 allow the driving current ILED generated by the driving transistor MNDRV to be forwarded to the light emitting device L2; hence, the light emitting device L2 will emit light based on the display data Vdata. Since the information of the data voltage Vdata has been stored in the capacitors C1 and C2 at the end of the scan phase P3, the driving current ILED may keep at its target level during the emission time.

The operational principles of the pixel circuit 50 are similar to those of the pixel circuit 20; hence, the driving current ILED may be calculated following a similar equation associated with NMOS transistors, which may be derived in a similar manner as Equation (1) for PMOS transistors as described above. More specifically, in the scan phase P3, the gate voltage VG of the driving transistor MNDRV may be equal to:

$$VG = V\text{init}n + V\text{th}n + \Delta V \times \alpha;$$

and the driving current ILED generated in the emission phase P4 may become:

$$I\text{LED} = K'(\Delta V \times \alpha)^2; \quad (2)$$

where $$\Delta V = V\text{data} - V\text{init}p;$$

$$\alpha = C2/(C1 + C2);$$

where K' represents the gain factor of the driving transistor MNDRV. In such a situation, the offset of the threshold voltage between pixels may be canceled in a similar manner.

In various embodiments of the present invention, the display data input to a pixel circuit is coupled to the driving transistor through a capacitor (e.g., the capacitor C2 in the pixel circuit 20 or 50), to generate a reduced voltage variation on the driving transistor which is smaller than the voltage variation of the data line. In other words, the input display data is multiplied by a ratio which is usually smaller than 1. Therefore, in order to generate a specific current level for driving the light emitting device to emit light, the operational voltage range of the input display data may be expanded. This facilitates the gamma voltage design to allocate more preferable gamma voltages for the grayscale values with finer resolution, so as to achieve a better display quality. In addition, the input display data is coupled to the drain terminal of the driving transistor and then forwarded to the gate terminal of the driving transistor. The above implementations are more feasible to a silicon-based display panel where the transistors are implemented with the CMOS process and have a higher mobility. In the silicon-based display panel, the desired driving current for the light emitting device is generated by a smaller voltage range (e.g., between 200 mV and 300 mV). The pixel circuit provided in the present invention may expand the operational voltage range of the display data, so as to facilitate the design of grayscale-to-voltage mapping.

To sum up, the present invention provides a novel pixel circuit of a display panel. In the pixel circuit, the input display data is coupled to the drain terminal of the driving transistor through a capacitor, and then forwarded to the gate terminal of the driving transistor. The capacitor coupling generates a smaller voltage variation on the driving transistor for generating the desired current to drive the light emitting device, which means that the operational voltage range of the display data is expanded. The pixel circuit is more feasible to a silicon-based display panel such as a micro-OLED panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A pixel circuit of a display panel, comprising:

a driving transistor, comprising a first terminal, a second terminal and a gate terminal;

a first capacitor, coupled to the gate terminal of the driving transistor;

a second capacitor, connected to the first terminal of the driving transistor;

a first transistor, coupled to the second terminal of the driving transistor;

a second transistor, coupled to the second capacitor;

a third transistor, coupled between the first terminal of the driving transistor and the gate terminal of the driving transistor;

a fourth transistor, coupled to the first terminal of the driving transistor;

a fifth transistor, coupled to the driving transistor; and a light emitting device, coupled to the fourth transistor;

wherein the second transistor is further coupled to a data line, to forward a display data from the data line to the second capacitor in a scan phase and forward an initial voltage from the data line to the second capacitor to initialize the second capacitor in another phase prior to the scan phase;

wherein in an initial phase, the second transistor, the third transistor and the fifth transistor are on simultaneously, and the first transistor and the fourth transistor are off.

2. The pixel circuit of claim 1, wherein the display data is coupled to the driving transistor through the second capacitor.

3. The pixel circuit of claim 1, wherein the display data is coupled to the driving transistor with a ratio determined according to the first capacitor and the second capacitor.

4. The pixel circuit of claim 1, wherein the second capacitor comprises:

a first terminal, coupled to the first terminal of the driving transistor; and a second terminal, coupled to the second transistor.

5. The pixel circuit of claim 1, wherein the first capacitor comprises:

a first terminal, coupled to the gate terminal of the driving transistor; and a second terminal, coupled to a power supply terminal.

6. The pixel circuit of claim 1, wherein the fifth transistor is coupled to the gate terminal of the driving transistor, to forward the initial voltage to the driving transistor.

7. The pixel circuit of claim 1, wherein the fifth transistor is coupled to the first terminal of the driving transistor, to forward the initial voltage to the driving transistor.

8. The pixel circuit of claim 1, wherein the first transistor is further coupled to a power supply terminal to receive a power supply voltage.

9. The pixel circuit of claim 1, wherein the first terminal of the driving transistor is a drain terminal of the driving transistor, and the second terminal of the driving transistor is a source terminal of the driving transistor.

10. The pixel circuit of claim 1, wherein the initial voltage is input to the pixel circuit through the fifth transistor in the initial phase.

11. The pixel circuit of claim 1, wherein in a compensation phase, the first transistor, the second transistor and the third transistor are on, and the fourth transistor and the fifth transistor are off.

12. The pixel circuit of claim 11, wherein compensation information is written into at least one of the first capacitor and the second capacitor in the compensation phase.

13. The pixel circuit of claim 1, wherein in the scan phase, the second transistor and the third transistor are on, and the first transistor, the fourth transistor and the fifth transistor are off.

14. The pixel circuit of claim 1, wherein in an emission phase, the first transistor and the fourth transistor are on, and the second transistor, the third transistor and the fifth transistor are off.

15. The pixel circuit of claim 14, wherein the fourth transistor forwards a driving current from the driving transistor to the light emitting device, to control the light emitting device to emit light in the emission phase.

* * * * *